UNITED STATES PATENT OFFICE.

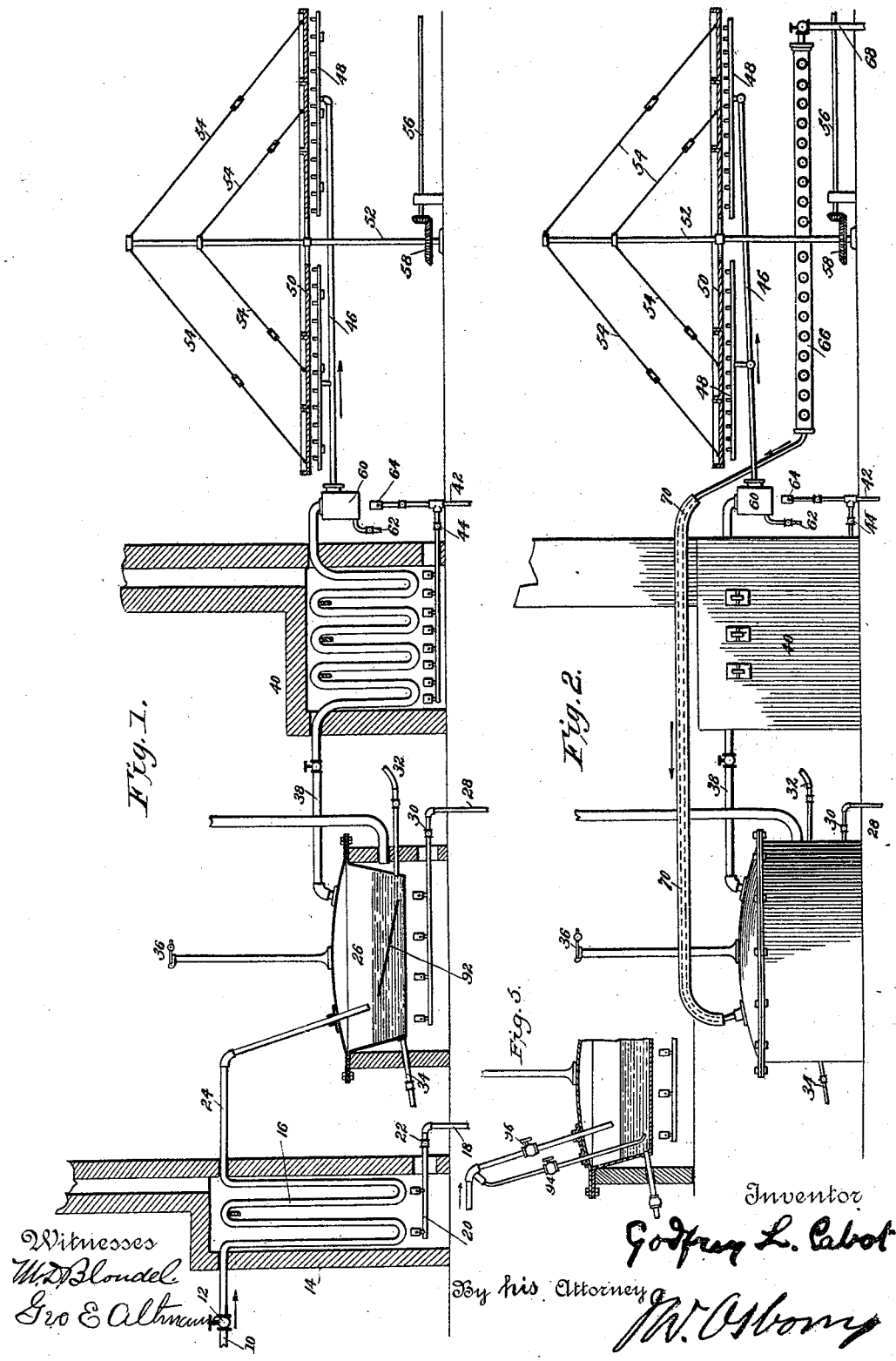

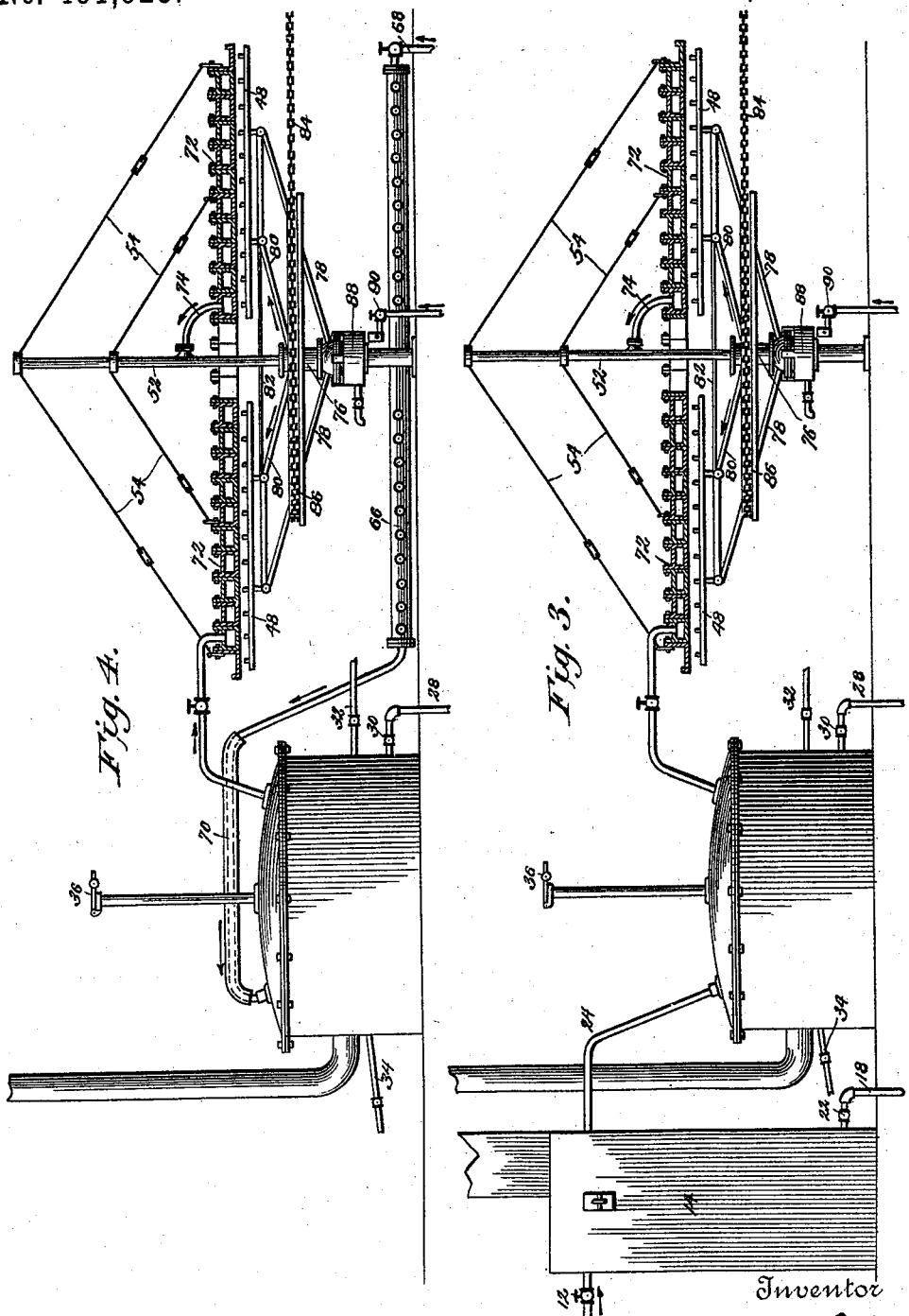

GODFREY L. CABOT, OF CAMBRIDGE, MASSACHUSETTS.

MANUFACTURE OF LAMPBLACK.

SPECIFICATION forming part of Letters Patent No. 491,923, dated February 14, 1893.

Application filed April 9, 1892. Serial No. 428,465. (No specimens.)

*To all whom it may concern:*

Be it known that I, GODFREY L. CABOT, a citizen of the United States, residing at Cambridge, in the county of Middlesex and State of Massachusetts, have invented certain new and useful Improvements in the Manufacture of Lampblack, of which the following is a specification.

My invention is related to the making of lampblack in general, but more especially to the making of the varieties of that substance obtained by burning natural, or other inflammable gas under suitable conditions.

Natural gas, which at present supplies much of the lampblack used in the arts, often under the name of carbon black, or gas black, is a mixture of hydrocarbon compounds, and it burns in the air with a luminous flame when ignited as it issues from common gas burners. Lampblack may be collected by deposition from such flames impinging against a plate of metal placed above them, that is much colder than the flames themselves. In its manufacture on a large scale by this method, a great many gas flames are closely distributed under a horizontal annular plate of iron of large dimensions, and the plate is caused to revolve very slowly above the burners; or, the burners as a whole are made to traverse the under surface of the plate. In either case provision is made for scraping the accumulating lampblack from the collecting plate continuously. This is not the only procedure by which lampblack may be made from gas, but it is well adapted to illustrate the application of my invention; which is designed to effect the manufacture of lampblack at a lesser cost, in a shorter time, and of quality better adapting it for certain uses in the arts, than is possible by the older methods. I accomplish this by loading, for the time being, any available inflammable gas, such as natural gas, with a vastly greater percentage of carbon (the hydrocarbons containing more than one atom of carbon to the molecule) than it normally possesses, then successfully burning the loaded gas in any lampblack apparatus, and simultaneously separating a great part of the carbon it contains in the desired form.

In carrying out my process, the inflammable gas employed, whatever its nature, is heated and passed over a large surface of petroleum [containing the heavier hydrocarbons] heated to about its boiling point; and the mixture of gas and vapor so produced is then superheated in well known apparatus. The resulting gaseous compounds are immediately carried forward, still in a hot condition to the burners, where, on being ignited, flames of an exceedingly yellow and smoky nature are produced in consequence of the large excess of hydrocarbons rich in carbon which are present, and which, by the method I have invented, are successfully burned that is made to give rise to carbon-depositing flames of peculiar efficacy and manageableness.

In Figure 1, an arrangement is shown in section by which my process may be worked. Figs. 2, 3, and 4, show chiefly in elevation the means that may be used for carrying out my process with modified apparatus. Fig. 5, shows means for producing in a modified way an agitation of the liquid hydrocarbon used.

In Fig. 1, the pipe marked 10, leads from the source of inflammable gas, the flow of which is controlled by the valve 12. The furnace 14, to which the pipe leads, is provided with tubes 16, suitably disposed in convolutions to heat the gas as it passes. The tubes 16 may be heated by any kind of fire, but gas is assumed to be the fuel used for heating in this furnace and in every other device requiring heat which is shown in the drawings forming part of this specification. In the furnace 14, the gas for heating is supplied through the pipe 18, to the burners 20, and its flow is controlled by the cock 22. The burners in this case may be of the Bunsen type, so as to give the maximum of heat with little light and no smoke. The pipe 24 from this heating furnace leads to a closed tank or still 26 in which the petroleum is heated, gas for which purpose is furnished by the pipe 28 and regulated by the cock 30. The oil is introduced into this vessel by the tube 32 which leads from a tank [not shown] or other oil supply arranged to maintain the oil in the closed vessel 26 at a constant level, in a way well understood. Furthermore, this still is furnished with the pipe 34 to drain it from time to time of residual matters; and with the safety valve 36 to keep the pressure from exceeding that which is most desirable. From the still the pipe 38, leads to the superheater 40, provided with convoluted tubes heated by gas supplied through the pipe 42, and cock 44, to suitable burners inside. The mixture of gas and oil after passing through the superheater enters the pipe 46, from which through branches it reaches the circular gridiron of pipes 48, which feed the contact-flames from the multitude of burners rising therefrom. Above these burners the collecting plate 50 is supplied, hanging chiefly from the standard 52, by tension rods 54, in the well known way. The standard revolves in a bearing at its lower end and is driven very slowly in some convenient way, as by the shaft 56, and bevel gearing at 58. In this depositing apparatus only the most essential parts are shown; the supports being all absent, also the apparatus for scraping the lower surface of the plate and disposing of the lampblack that is disengaged. Also, the buildings required to cover and protect the machinery generally.

In an arrangement such as that described and shown, the following changes and reactions take place. The current of gas passing over the surface of the boiling oil in the still 26, promotes in a very high degree its evaporation, by reason of its supplying a constantly renewed atmosphere differing in constitution from that of the vaporized petroleum compounds entering it. This process of diffusion is also greatly promoted by the heating of the gas, and the tendency which the cold gas would have to cause condensation of the oil vapor is likewise thereby counteracted. The mixture of vapor and gas as it is forced from the still, is of a very complex constitution. Some of the hydrocarbon compounds contained therein are close to the temperature at which they return to the liquid form, though that return is hindered to a considerable extent by their dilution and diffusion into, that is, throughout a permanent and specifically light gas. Still it is not improbable that at times misty precipitations of the heavier constituents with high boiling points, may exist suspended above the oil in the form of a cloud or mist of atomized particles. Irregularities due to condensation, which fluctuations in temperature would certainly give rise to, are overcome by conducting the mixture of vapor and gas through the superheater 40, and therein raising its temperature decidedly above that of the boiling point of the heaviest hydro-carbons in the still. The superheater is in close proximity to the lampblack apparatus proper, and the loaded gas reaches the burners so hot that precipitation is practically out of the question. Here it behaves as a fixed gas burning with a smoky flame that insures a yield of lampblack contrasting favorably with that afforded by the combustion of illuminating gases of every available kind. Nevertheless it is wise to provide between the superheater and the gas burners under the collecting plate, a "catch vessel" consisting of a small closed receptacle adapted to receive any condensed drops of fluid, which at times, and especially during interruptions in the process of manufacture, can hardly be avoided. In the figures the closed receptacle for this purpose is marked 60, and from time to time the collection contained therein is either drawn off by the cock 62, or volatilized by a strong heat furnished by the Bunsen lamp 64, and burned with the superheated gas passing over it.

It is a condition essential to the success of my process that when everything is in running order, the mixture of oil and gas after superheating, should reach the burners so hot as to deposit nothing; and should flow through them and supply the contact flames exactly as a permanent gas would do at ordinary temperatures. The accomplishment of this object is much facilitated by the very high temperature which exists everywhere under the collecting plate, in consequence of the strong radiation of heat from the numerous flames and from the plate itself.

In the foregoing the details of the several steps constituting my invention have been stated and explained in their typical form. I proceed now to set forth developments in my process tending toward greater perfection in the same, and dependent on conditions inherent in the lampblack process itself as the same is now known and practiced.

When a great number of flames are burned for this manufacture, and especially when they are closely arranged under a plate of metal many feet in diameter, the heat they give rise to is very great. This heat is in large part radiated downward toward the floor of the building in which the gas is burned and is, under ordinary circumstances, lost as far as the serving of any useful purpose is concerned. I have utilized this radiant heat as shown in Fig. 2, by placing near the floor of the building which contains the contact-flames and collecting plate, a number of horizontal pipes 66, so arranged as to cause a circulation of the natural or equivalent gas entering cold at 68, and issuing, after traversing the tubular convolutions, through the pipe 70. This may be protected by a non-conducting covering from loss of heat, when it has passed beyond the radiation from the flames and hot plate. In this way the heater 66, takes the place of the heater 14, with a manifest saving in fuel and space.

In Fig. 3, another important step in the development of my process is shown. In this arrangement I avail myself of the very high temperature to which the collecting plate is raised by the direct impingement of the flames against its under surface. The plate on which the deposition of lampblack takes place is not, as in Figs. 1, and 2, built up of simple flanged segments bolted together, but of metal tubes 72, having a square or rectangular cross section, each of proper length and bolted together by flanges and lugs provided for that purpose. The lower surface of these square pipes lying in the same plane form the collecting surface, while the tubes opening into each other at their alternate ends, establish means for a circulation throughout the heated mass of metal. The gas having passed through the heater 14, and still 26, is conducted by the tube 38, to the end of one of the square tubes forming the collecting plate, and having traversed the whole is made to pass by the tube 74, into the tubular standard 52. Through this, [stopped above and below] the superheated gaseous mixture passes downward and through openings in the side of the standard [indicated with dotted lines] into the gas box 76. This is a cylinder which forms an annular chamber about the standard and revolves on it. It is so packed above and below as not to leak gas. From this chamber the pipes 78, lead to the gridiron of tubes which directly supply the burners. In this lampblack apparatus the collecting plate is stationary, and the multi-burner lamp below it, is supported by the struts 80, and the rods 82. The lamp together with the gas box, is furthermore made to revolve conveniently by the drive chain 84, lying in a large ring of angle-iron 86, which itself forms part of the lamp. In this case the gas and oil are heated as before and mixed in the vessel 26, after which the superheating takes place in the tubes 72, which are subjected to the direct action of the flames below, and may be protected from loss of heat through upward radiation, by a stratum of asbestos or other non-conductor [not shown in the drawings]. From this modified superheater the hot gaseous mixture passes to the burners from which the contact-flames reach the plate. In Fig. 3, the catch vessel 88, is a prolongation of the gas box downward, which may be heated when desired by the gas supplied through the pipe and cock at 90.

In Fig. 4, the developments shown in Figs. 2 and 3, are combined, so that the apparatus for my process under such conditions consists of a heater which utilizes the radiated heat from the flames, and a superheater which utilizes the conducted heat from the same, the first preceding the mixing of the oil and gas in the closed oil vessel, and the second following thereupon and preparing the mixture for uninterrupted combustion in the multi-flame lamp, whereby the product desired is advantageously produced and some of the heat which promotes said advantageous production also.

It will be readily understood, that in an apparatus like that shown, adjustments may be made which have for their object the loading of a light gas, like marsh gas, with just such an amount of heavy petroleum compounds as will give the most serviceable yield of lampblack, when the mixture is burned hot in the manner described. This is best done by adjusting the degree of heat imparted to the gas in the pipes 16 or 66, and the oil in 26, to the quantity of gas forced through the whole apparatus. The position of the cocks at 22, and 30, determine the former in Fig. 1, while the latter is controlled by the valves 12 and 68.

In Figs. 2 and 4, the maximum heat will be obtained in the heater 66, when the convolutions of tubing of which it is composed are long enough, and of sufficient internal surface to fully raise the gas passing through them to their own temperature. But the interposition of screens will immediately reduce that temperature to any required extent, where it will then remain till a change is made in the disposition of such screens; which may be simply loose pieces of sheet iron.

The energy and regularity with which the several petroleum compounds evaporate is influenced as before explained, by the presence of the hot gas in the still, by the heat conveyed to the oil, and by the removal of the oil vapor as fast as it is formed; but they are also affected very decidedly by the agitation of the liquid in the still. Such agitation may be accomplished in a variety of ways, mechanically, or by the production of heat currents as indicated in Fig. 1; 92 being a plate of metal forming a false bottom and determining a circulation which is consequent on differences of expansion in the oil. By forcing the entering gas or part of it through the liquid, an energetic agitation may also be produced and fresh evaporating surfaces exposed to the foreign atmosphere afforded by the hot gas. The ebullition caused by agitating in this way and the spray of oil produced by it, should not become excessive so as to cause irregularity, or an unmanageable mixture of oil and gas in the superheater. In Fig. 5, the desirable modifications of the still-attachments for this kind of agitation are shown; the valves 94 and 96 being used to control the violence of the ebullition and consequent motion of the mass of hot oil; compelling more or less of the entering gas to pass through and issue from the smaller tube, according to the wish of the operator.

The temperature of the superheater is adjusted as is that of the other furnaces; but there is less necessity for accuracy for very obvious reasons. It is enough if a heat is imparted to the mixture of oil and gas sufficiently in excess of that which vaporizes the former completely [if present as a mist or spray], to guard against and hinder a return to the liquid state of any one of the heavier hydrocarbons, while the mixed gases are passing from the superheater to the burners under the collecting plate. This is much facilitated by the high temperature of all the tubing under the flames by reason of the intense radiation from the latter, as has been already explained. It will therefore be readily understood that relatively a very moderate temperature in the superheater is sufficient and desirable, but that one much in excess of what is indispensable can do no harm in the prosecution of my process, and hence a considerable range of temperature is admissible.

From what has been said it will be understood, that my process is not dependent for its prosecution on the use of the heavy hydrocarbons only, as the lighter compounds of that class, though inferior in value, are also adapted for loading a gas with soot-giving materials; in fact, so long as crude petroleum is employed, [obviously the most economic material for the purpose,] the presence of a certain proportion of the light hydrocarbons cannot be avoided. And while my process is designed and adapted for dealing especially with the heavy hydrocarbons the lighter hydrocarbons cause no difficulty, though the richer an "oil" is in the former the less will be the quantity thereof required to charge any gas sufficiently, and the greater the production of lampblack within a given time.

Having thus described my method and fully explained the conditions affecting the successful prosecution of the same, I wish it to be understood that I do not confine myself to details, or special ways of performing the several operations that constitute the same, so long as the principle involved is observed; being well aware that many modifications are possible without affecting the nature of my process. As instances of two such changes it may be said, that by cutting off the gas to the burners 20, and driving, as a consequence, cold gas through very hot oil in 26, the gas will be heated and will take up and dilute the oil vapor as before; the mass of oil, if its quantity be sufficient, itself playing the part of the first heater and also performing its own function. Or; the gas passing through the heater 14, may be made so hot, as, when driven through the cold oil in 26 [the cock 30 being closed] to heat said oil and cause the evaporation of the same into the atmosphere of gas, cooled to the temperature it should normally have. Such modifications and others like them are technically possible, but are by no means practical or economical, and I have not therefore recommended their adoption.

In the foregoing the method of producing lampblack by contact-flames has been chiefly considered; but, as already stated, my process may be applied generally in conjunction with every kind of lampblack apparatus in which gas of any kind is the source of carbon. If natural gas loaded with crude petroleum of a temperature at or above the boiling point of the latter, as hereinbefore specified, be conveyed still hot to a number of burners adapted by their construction or location to allow of the consumption of gas in part only, on account of a scanty supply of air; the lampblack emitted by such flames can be caused [in the well known way] to enter a settling chamber, from which the resulting deposit may be periodically removed. In this case, as in that of the contact-flames, the addition to the light marsh gas of the petroleum compounds rich in carbon, will vastly increase the yield of lampblack as compared with that from flames fed by uncharged gas only.

In this specification I do not claim the special mechanical devices employed, nor the combinations existing between the several parts of the apparatus, as they form the subject matter of a separate application for patent, wherein they are fully specified and shown, and was filed in the United States Patent Office on the 23d day of January, 1893, and serially numbered 459,361.

What I claim is:—

1. The improvement in the art of making lampblack which consists in; superheating a mixture of inflammable gas and oil, and then burning the gaseous mixture while hot in a lampblack apparatus; substantially as described.

2. The improvement in the art of making lampblack which consists in; loading an inflammable gas with heavy hydrocarbons; then superheating the loaded gas, and then burning the gaseous mixture while still hot in a lampblack apparatus; substantially as described.

3. The improvement in the art of making lampblack which consists in; loading a hot inflammable gas with hot hydrocarbons boiling at high temperatures; then superheating the mixture, and then while still superheated, burning the same in a lampback apparatus adapted for gas; substantially as described.

4. The improvement in the art of making lampblack which consists in; first heating an inflammable gas; then, in a closed vessel, bringing the hot gas into contact with petroleum heated to about its boiling point; then superheating the mixture of gas and vaporized petroleum; and then while still hot and gaseous, burning the same in a lampblack apparatus; substantially as described.

5. The improvement in the art of making lampblack which consists in; first heating an inflammable gas by radiant heat from gas flames in a lampblack apparatus; then, in a closed vessel, bringing the hot gas into contact with petroleum heated to about its boiling point; then superheating the mixture of gas and petroleum; and then while still hot and gaseous, burning the same in a lampblack apparatus; substantially as described.

6. The improvement in the art of making lampblack which consists in; first heating an inflammable gas; then, in a closed vessel, bringing the hot gas into contact with petroleum heated to about its boiling point; then superheating the mixture of gas and vaporized petroleum by exposing it to the heated collecting plate of a lampblack apparatus; and then while still hot and gaseous burning the same in a lampblack apparatus; substantially as described.

7. The improvement in the art of making lampblack which consists in; first heating an inflammable gas by radiant heat from the flames in a lampblack apparatus; then mixing the hot gas with the vapor of hot petroleum; then superheating the mixture by directly conducted heat from the same flames; and then before the condensation of the vaporized hydrocarbons, burning the same in a lampblack apparatus; substantially as described.

8. The improvement in the art of making lampblack which consists in; first, heating an inflammable gas; then bringing it into contact with heavy petroleum compounds maintained at or near the boiling point and kept in a state of active agitation; then passing the diffused or suspended oil products and gas together through a superheater, and then burning the superheated mixture in a lampblack apparatus; substantially as described.

9. The improvement in the art of making lampblack which consists; in burning under a collecting plate, a number of contact flames, which are fed by natural gas loaded with crude petroleum at or above the boiling temperature of the constituents thereof; substantially as described.

GODFREY L. CABOT.

Witnesses:
L. P. WALKER,
H. L. WALKER.